United States Patent
Peng et al.

(10) Patent No.: US 10,005,244 B2
(45) Date of Patent: Jun. 26, 2018

(54) MANUFACTURING METHOD OF PRESSURE VESSEL WITH HEATING DEVICE

(71) Applicant: Hsiu-Lin Peng, Tainan (TW)

(72) Inventors: Hsiu-Lin Peng, Kaohsiung (TW); Yu-Yao Chen, Tainan (TW)

(73) Assignee: Hsiu-Lin Peng, Tainan (TW)

( * ) Notice: Subject to any disclaimer, the term of this patent is extended or adjusted under 35 U.S.C. 154(b) by 196 days.

(21) Appl. No.: 15/098,297

(22) Filed: Apr. 13, 2016

(65) Prior Publication Data

US 2016/0311181 A1    Oct. 27, 2016

(30) Foreign Application Priority Data

Apr. 24, 2015    (CN) .......................... 2015 1 0200297

(51) Int. Cl.
| | | |
|---|---|---|
| *B29C 70/68* | (2006.01) | |
| *B29C 70/44* | (2006.01) | |
| *B29C 70/86* | (2006.01) | |
| *B29C 70/08* | (2006.01) | |
| *B29K 101/10* | (2006.01) | |

(Continued)

(52) U.S. Cl.
CPC .......... *B29C 70/446* (2013.01); *B29C 70/086* (2013.01); *B29C 70/443* (2013.01); *B29C 70/86* (2013.01); *B29K 2101/10* (2013.01); *B29K 2105/06* (2013.01); *B29K 2105/253* (2013.01); *B29K 2995/0015* (2013.01); *B29L 2031/7156* (2013.01)

(58) Field of Classification Search
CPC ..... B29C 70/443; B29C 70/86; B29C 70/086; B29C 70/446; B29K 2101/10; B29K 2105/06; B29K 2995/0015; B29K 2105/253; B29L 2031/7156
See application file for complete search history.

(56) References Cited

U.S. PATENT DOCUMENTS

2012/0279971 A1* 11/2012 Brooks ..................... F17C 1/12
220/560.12

FOREIGN PATENT DOCUMENTS

| CN | 201421214 | 3/2010 |
|---|---|---|
| CN | 202141235 | 2/2012 |

(Continued)

OTHER PUBLICATIONS

"Office Action of Taiwan Counterpart Application," dated Feb. 21, 2017, p. 1-p. 7, in which the listed references were cited.

*Primary Examiner* — Vishal I Patel
(74) *Attorney, Agent, or Firm* — JCIPRNET

(57) ABSTRACT

A manufacturing method of a pressure vessel with heating device includes the following steps. A bag-shaped fiber layer with a first bag opening and a bag-shaped insulation layer with a second bag opening are provided. The bag-shaped insulation layer is placed in the bag-shaped fiber layer. The bag-shaped fiber layer is placed in an external mold. A pressurizing process is performed in the cavity of the bag-shaped insulation layer and air is extracted from the bag-shaped fiber layer. A resin solution is injected into the bag-shaped fiber layer to form a bag-shaped resin fiber layer soaked with the resin solution. A curing process is performed on the bag-shaped resin fiber layer to cure the bag-shaped resin fiber layer and to attach it to the bag-shaped insulation layer. A heating device is installed in the bag-shaped layers via a fastening component. The cured first and second bag openings are sealed.

20 Claims, 4 Drawing Sheets

(51) Int. Cl.
　　　*B29K 105/06*　　　(2006.01)
　　　*B29K 105/00*　　　(2006.01)
　　　*B29L 31/00*　　　(2006.01)

(56) References Cited

FOREIGN PATENT DOCUMENTS

| CN | 202295829 | 7/2012 |
| CN | 202757303 | 2/2013 |
| CN | 104374087 | 2/2015 |

* cited by examiner

MANUFACTURING METHOD OF PRESSURE VESSEL WITH HEATING DEVICE

CROSS-REFERENCE TO RELATED APPLICATION

This application claims the priority benefit of China application serial no. 201510200297.0, filed on Apr. 24, 2015. The entirety of the above-mentioned patent application is hereby incorporated by reference herein and made a part of this specification.

BACKGROUND OF THE INVENTION

Field of the Invention

The present disclosure generally relates to a manufacturing method of a vessel. Specifically, the present disclosure relates to a manufacturing method of a pressure vessel with a heating device.

Description of Related Art

In conventional technology, a pressure vessel with heating device such as a storage water heater, solar energy water heater, pharmaceutical or chemical reaction vessel, brewing or food-processing vessel, etc. is usually in cylindrical shape and a heating device is placed inside the pressure vessel. As such, the cylindrical shape can satisfy the pressure bearing requirement while reducing the wall thickness of the pressure vessel. Placing the heating device inside the pressure vessel can help confine the thermal energy within the enclosed cavity of the vessel, to improve the heating efficiency.

Usually metal or, more recently, composite materials are used as the material for a pressure vessel to meet the requirements of both pressure bearing and thermal stability. Taking a pressure vessel made of metal for instance, the pressure vessel is usually built with three steel sections such as a top cap, a bottom cap and a cylindrical tube in between. These three steel sections are welded together to form the pressure vessel which is required to withstand at least 10 kg/cm$^2$ of working pressure. The inner surface of the pressure vessel usually is coated with ceramic or glass coating, and is baked under the temperature of 800° C. to 900° C. to form a protective layer to prevent corrosion. In addition, an anode rod needs to be placed in the pressure vessel to prevent the corrosion of steel caused by hot water or other liquid. However, the anode rod would be depleted after 2 to 3 years, and the cost for replacement is high in order to maintain the corrosion resistance of the pressure vessel.

Taking a pressure vessel made of composite material for example, filament winding method is most commonly adopted to form the cylindrical structure of the pressure vessel. The basic concept of the filament winding method is to wind a continuous reinforced filament under tension over a rotating mandrel. Namely, the mandrel is inserted on a rotating spindle and the filament is wound around the rotating mandrel in a desired pattern or angle. The filament is impregnated in a bath with resin as they are wound onto the mandrel.

However, to form the vessel by filament winding method, the filament impregnated with resin has to be wound around the rotating mandrel till the mandrel is completely covered in multiple layers to the desired thickness, so the speed of manufacturing is relatively slow. Moreover, the mandrel is hard to remove after being covered by the filament impregnated with resin, so it usually stays within the pressure vessel as a part of the supporting structure, increasing the weight of the product. In addition, in many applications the material of the mandrel needs to be food-grade material with corrosion resistance and thermal stability, which increases the production cost.

SUMMARY OF THE INVENTION

The present disclosure is directed to a manufacturing method of a pressure vessel with a heating device, which improves manufacturing efficiency, lowers production cost, and avoids the corrosion issue.

The present disclosure provides a manufacturing method of a pressure vessel with a heating device. The manufacturing method includes the following steps. First, a bag-shaped fiber layer having a first bag opening is provided. Next, a bag-shaped insulation layer having a second bag opening is provided. Then, the bag-shaped insulation layer is placed inside the bag-shaped fiber layer through the first bag opening, and the second bag opening corresponds to the first bag opening. Next, the bag-shaped fiber layer and the bag-shaped insulation layer are placed in an external mold. Then, a pressurizing process is performed in an inner cavity of the bag-shaped insulation layer through the second bag opening. Air is also evacuated out of the bag-shaped fiber layer, which is in between the bag-shaped insulation layer and the external mold. As a result, the outer surface of the bag-shaped insulation layer becomes tightly adjacent to the inner surface of the bag-shaped fiber layer and an outer surface of the bag-shaped fiber layer becomes tightly adjacent to the inner surface of the external mold. A resin solution is injected into the bag-shaped fiber layer to form a bag-shaped resin fiber layer soaked with the resin solution. Then, a curing process is performed on the bag-shaped resin fiber layer to cure the bag-shaped resin fiber layer, so as to attach the bag-shaped resin fiber layer to the bag-shaped insulation layer. Next, a heating device is installed and fastened to the bag-shaped resin fiber layer and the bag-shaped insulation layer. Then, the first bag opening and the second bag opening, cured and attached together, are sealed with a cover cap.

According to an embodiment of the disclosure, the heating device includes an electric heater, a combustion heater, or a heat exchanger.

According to an embodiment of the disclosure, material of the bag-shaped fiber layer includes carbon fiber, glass fiber, or aramid fiber.

According to an embodiment of the disclosure, the bag-shaped fiber layer is formed by a weaving method.

According to an embodiment of the disclosure, the bag-shaped fiber layer is formed by a non-weaving method.

According to an embodiment of the disclosure, the pressurizing process includes providing gas and/or liquid with positive pressure into the bag-shaped insulation layer through the second bag opening.

According to an embodiment of the disclosure, the external mold further includes at least one discharge outlet, and air between the external mold and the bag-shaped insulation layer is discharged from the discharge outlet.

According to an embodiment of the disclosure, the manufacturing method further includes performing an air extracting process to the discharge outlet, such that the air between the external mold and the bag-shaped insulation layer is extracted from the discharge outlet.

According to an embodiment of the disclosure, the external mold further includes a resin injection hole, the resin solution is injected into the bag-shaped fiber layer between the external mold and the bag-shaped insulation layer through the resin injection hole, such that the bag-shaped fiber layer is soaked in the resin solution to form the bag-shaped resin fiber layer.

According to an embodiment of the disclosure, the method of injecting the resin solution between the external mold and the bag-shaped insulation layer comprises pressurizing injection and/or siphoning injection.

According to an embodiment of the disclosure, the curing process includes performing a heating process on the bag-shaped resin fiber layer.

According to an embodiment of the disclosure, the heating process includes infrared irradiation, electric heating, steam heating, or thermal fluid heating.

According to an embodiment of the disclosure, the bag-shaped fiber layer further includes at least one fastening component inserted in the bag-shaped fiber layer.

According to an embodiment of the disclosure, the fastening component includes a metal fastening component.

According to an embodiment of the disclosure, the fastening component includes a non-metal fastening component.

According to an embodiment of the disclosure, the bag-shaped insulation layer further includes at least one engaging area to be engaged with the at least one fastening component.

According to an embodiment of the disclosure, the step of disposing the bag-shaped insulation layer in the bag-shaped fiber layer further includes engaging the bag-shaped insulation layer with the at least one fastening component of the bag-shaped fiber layer.

According to an embodiment of the disclosure, the step of fastening the heating device to the bag-shaped resin fiber layer and the bag-shaped insulation layer further includes fastening the heating device to the fastening component and the heating device extended to the inner cavity of the bag-shaped insulation layer.

According to an embodiment of the disclosure, the heating device is fastened to a side surface of the bag-shaped resin fiber layer and the bag-shaped insulation layer and extended to the inner cavity of the bag-shaped insulation layer.

According to an embodiment of the disclosure, the heating device is fastened to the first bag opening and the second bag opening with the cover cap sealed thereon.

Based on the above-mentioned description, in the present disclosure, the bag-shaped insulation layer is placed in the bag-shaped fiber layer and then the bag-shaped fiber layer is placed in the external mold. Then, a pressure is applied to an inner cavity of the bag-shaped insulation layer and the air in the bag-shaped fiber layer is evacuated, so the bag-shaped insulation layer and the bag-shaped fiber layer become tightly adjacent to the external mold. The resin solution is injected into the bag-shaped fiber layer to form the bag-shaped resin fiber layer soaked with resin solution, and a heating process is performed to cure the bag-shaped resin fiber layer to form the pressure vessel. As such, the bag-shaped insulation layer is configured to insulate the liquid contained in the pressure vessel from the bag-shaped resin fiber layer. Therefore, only the bag-shaped insulation layer needs to meet the standards for food safety and corrosion resistance under the operating temperature. Compared with the mandrel used in filament winding, the bag-shaped insulation layer uses less material so as to reduce production cost. In addition, the manufacturing method in the present disclosure simplifies the manufacturing process so as to greatly improve the speed of manufacturing. Moreover, the external mold of the present disclosure is located outside the bag-shaped resin fiber layer, so it can be optionally removed after the manufacturing process, which enhances the design flexibility of the pressure vessel.

Several exemplary embodiments accompanied with figures are described in detail below to further explain the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DESCRIPTION OF THE EMBODIMENTS

The present disclosure will now be described more fully with reference to the accompanying drawings, in which exemplary embodiments of the disclosure are shown. The terms used herein such as "top," "bottom," "front," "back," "left," and "right," etc., are for the purpose of describing directions in the figures only and are not intended to be limiting of the disclosure. Moreover, in the following embodiments, the same or similar reference numbers denote the same or like components.

Figure 1:
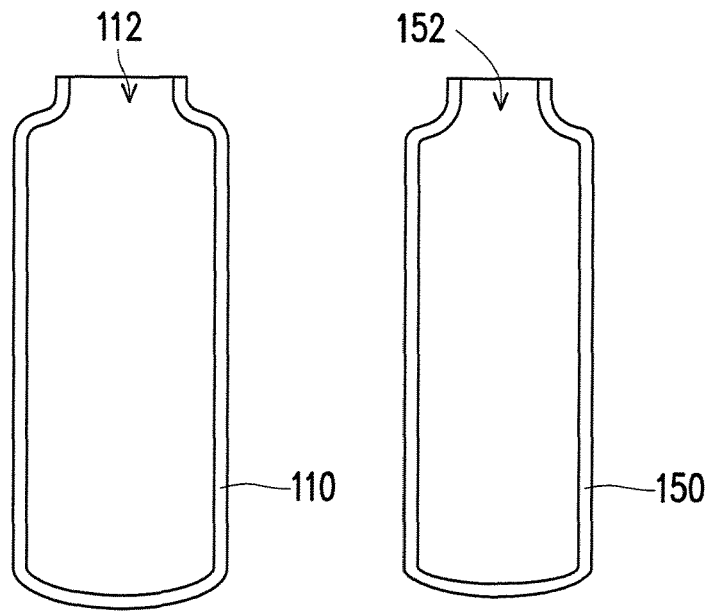
FIG. 1 to FIG. 5 are schematic diagrams illustrating manufacturing process of a pressure vessel with a heating device according to an exemplary embodiment.

FIG. 1 to FIG. 5 are schematic diagrams illustrating a manufacturing method of a pressure vessel with a heating device according to an exemplary embodiment. In the present disclosure, the manufacturing method can be utilized to manufacture a pressure vessel with a heating device such as an inner vessel of a storage water heater or food processing container. Certainly, embodiments disclosed herein are not limited thereto. In the present disclosure, the manufacturing process of a pressure vessel with a heating device may include the following steps. First, a bag-shaped fiber layer 110 as shown in FIG. 1 is provided, wherein the bag-shaped fiber layer 110 has a first bag opening 112, and the material thereof may include carbon fiber, glass fiber, aramid fiber or any other suitable material. In an embodiment disclosed herein, the bag-shaped fiber layer 110 may be formed by a weaving method, and/or by a non-weaving method. The present disclosure does not limit the manufacturing method of the bag-shaped fiber layer 110. Moreover, in an embodiment disclosed herein, a bag-shaped insulation layer 150 having a second bag opening 152 is further provided. The material of the bag-shaped insulation layer 150 may be food-grade material with thermal stability and corrosion resistance under the desired operating temperature. For example, the bag-shaped insulation layer 150 needs to at least withstand the curing temperature of a thermosetting resin during the curing period of the thermosetting resin. In addition, the pressure vessel of the present embodiment may contain liquid, e.g., water, whose temperature ranges from 50° C. to 100° C. Therefore, the long-term thermal stability and safety of the bag-shaped insulation layer 150 need to be at least above 100° C.

Figure 2:
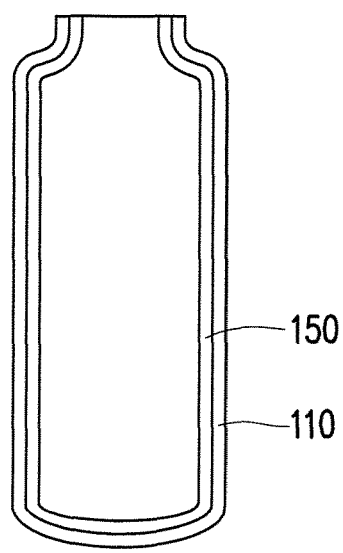
Figure 3:
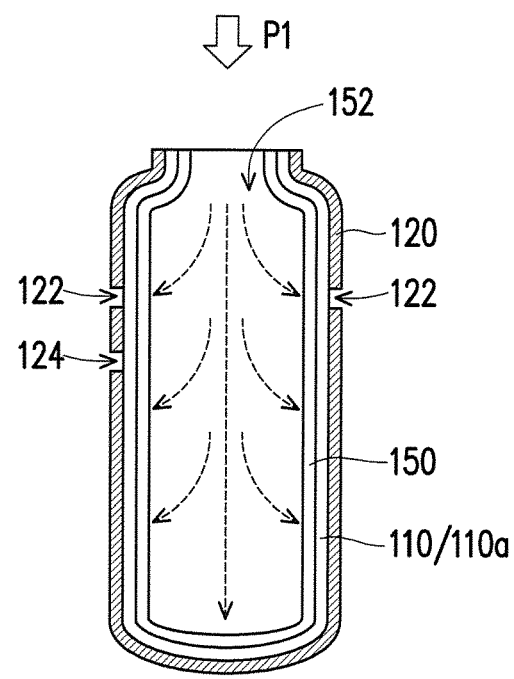

Referring to FIG. 2, the bag-shaped insulation layer 150 is placed inside the bag-shaped fiber layer 110 through the first bag opening 112, and the second bag opening 152 corresponds to the first bag opening 112. Then, referring to FIG. 3, the bag-shaped fiber layer 110 and the bag-shaped insulation layer 150 are placed in an external mold 120. In the present disclosure, the external mold 120 can be any kind of mold with thermal stability (capable of at least withstanding the curing temperature of the thermosetting resin during the curing period of the thermosetting resin), and the shape thereof is the shape of the pressure vessel to be formed.

Figure 4:
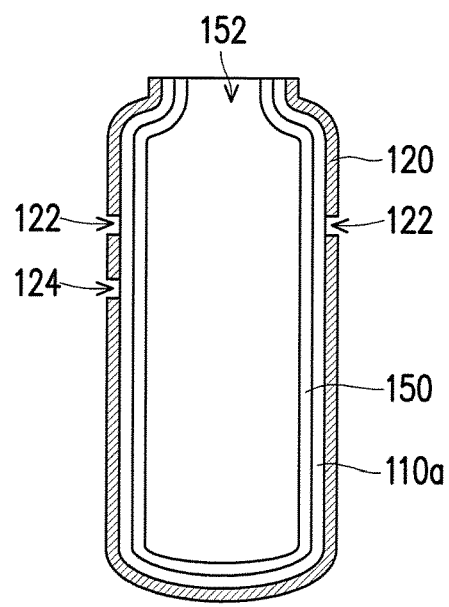

Referring to FIG. 4, a pressurizing process is performed in the inner cavity of the bag-shaped insulation layer 150 through the second bag opening 152. Namely, a positive pressure P1 is provided into the bag-shaped insulation layer 150 through the second bag opening 152. In an embodiment disclosed herein, the step of the pressurizing process includes providing gas and/or liquid with positive pressure into the bag-shaped insulation layer 150 through the second bag opening 152. Certainly, the present disclosure is not limited thereto. In an embodiment disclosed herein, the external mold 120 may further include at least one discharge outlet 122. As such, when the positive pressure P1 is provided through the second bag opening 152 to the cavity in the bag-shaped insulation layer 150, the air between the external mold 120 and the bag-shaped insulation layer 150 can be discharged from the discharge outlet 122. In addition to the positive pressure P1, an air extracting process may be performed to the discharge outlet 122 to help remove the air in the bag-shaped fiber layer 110, which is in between the external mold 120 and the bag-shaped insulation layer 150, so as to make the outer surface of the bag-shaped insulation layer 150 tightly adjacent to the inner surface of the bag-shaped fiber layer 110, and the outer surface of the bag-shaped fiber layer 110 tightly adjacent to the inner surface of the external mold 120.

A resin solution is injected into the bag-shaped fiber layer 110 to form a bag-shaped resin fiber layer 110a soaked with the resin solution. In an embodiment disclosed herein, the resin solution may be a solution of thermosetting resin, so as to cure the bag-shaped resin fiber layer 110a by heating thereafter. Certainly, the present disclosure is not limited thereto as long as the composition of the resin solution is curable. In detail, the external mold 120 may further include a resin injection hole 124, so the resin solution can be injected, through the resin injection hole 124, into the bag-shaped fiber layer 110, which is in between the external mold 120 and the bag-shaped insulation layer 150, such that the bag-shaped fiber layer 110 is soaked in the resin solution to form the bag-shaped resin fiber layer 110a.

The resin solution may be injected between the external mold 120 and the bag-shaped insulation layer 150 through the resin injection hole 124 by pressurizing injection and/or siphoning injection. Namely, the resin solution may be injected between the external mold 120 and the bag-shaped insulation layer 150 through the resin injection hole 124 by applying pressure thereto. Alternatively, a siphon method may be adopted. Namely, at the time the resin solution is injected through the resin injection hole 124, a negative pressure is provided between the external mold 120 and the bag-shaped insulation layer 150 to guide and facilitate the resin solution to completely soak the bag-shaped fiber layer 110. The above-mentioned method can be adopted at the same time to enhance the speed of manufacturing.

In addition, in one embodiment of the present disclosure, the bag-shaped fiber layer 110 may be firstly soaked in the resin solution to form the bag-shaped resin fiber layer 110a before the bag-shaped insulation layer 150 is placed therein. In this embodiment, the resin solution may be a solution of thermosetting resin, so the bag-shaped resin fiber layer 110a can be cured in the subsequent heating process. Of course, the present disclosure is not limited thereto as long as the composition of the resin solution is curable.

As shown in FIG. 4, a curing process is then performed on the bag-shaped resin fiber layer 110a, so as to cure the bag-shaped resin fiber layer 110a and to attach the bag-shaped resin fiber layer 110a to the bag-shaped insulation layer 150. For instance, the curing process may include performing a heating process on the bag-shaped resin fiber layer 110a, wherein a heating temperature of the heating process typically ranges from 75° C. to 175° C. The heating process may include infrared irradiation, electric heating, steam heating, or thermal fluid heating, etc. The present disclosure does not limit the curing method for the bag-shaped resin fiber layer 110a in terms of the heating method or the heating temperature. As such, the bag-shaped resin fiber layer 110a can be cured to the shape of the external mold 120. In an embodiment disclosed herein, one may optionally choose not to remove the external mold 120, so as to allow the external mold 120 functioning as structural reinforcement for the pressure vessel 100.

Figure 5:
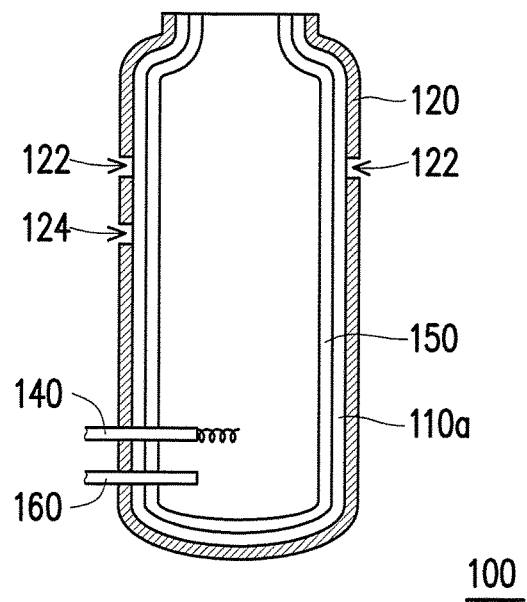

Referring to FIG. 5, a heating device 140 is installed in the bag-shaped insulation layer 150. In an embodiment disclosed herein, the heating device 140 includes an electric heater, a combustion heater, a heat exchanger, etc. Then, the first bag opening 112 and the second bag opening 152 cured and attached together are then sealed with a cover cap, e.g., the cover cap 130 shown in FIG. 6. Accordingly, the pressure vessel 100 is substantially formed.

In detail, the bag-shaped fiber layer 110 may further include at least one fastening component engaged with the bag-shaped fiber layer 110. In an embodiment disclosed herein, the bag-shaped fiber layer 110 may include a plurality of fastening components engaged with the bag-shaped fiber layer 110. The fastening component may be a screw, O-ring or washer, etc., and the material thereof may be metal or non-metal material. Namely, the fastening component may be metal or non-metal. The present disclosure does not limit the types and the material of the fastening component. Moreover, the fastening component may be inserted in the bag-shaped fiber layer 110 during the process of forming the bag-shaped fiber layer 110 by weaving or non-weaving method. The present disclosure is not limited thereto. Accordingly, the bag-shaped insulation layer 150 may further include at least one engaging area to be engaged with the at least one fastening component, so when the bag-shaped insulation layer 150 is tightly adjacent to the bag-shaped fiber layer 110, the bag-shaped insulation layer 150 is engaged with the fastening component of the bag-shaped fiber layer 110 via the engaging area.

As such, the heating device 140 may be fastened to the bag-shaped insulation layer 150 and the cured bag-shaped resin fiber layer 110a via the fastening component; namely, the heating device 140 may be fastened to the fastening component extended to the inner cavity of the bag-shaped insulation layer 150. The heating device 140 can therefore heat up the liquid, such as water, contained in the pressure vessel 100. In an embodiment disclosed herein, the heating device 140 is fastened to a side surface of the bag-shaped insulation layer 150 and extended to the inner cavity of the bag-shaped insulation layer 150. The heating device 140 may also be fastened to the bag-shaped insulation layer 150 and the cured bag-shaped resin fiber layer 110a via the fastening component by hole drilling, mechanical connecting, chemical adhering, etc. In addition, in an embodiment disclosed herein, the same fastening method may be adopted to fasten the sensor 160 to the bag-shaped insulation layer 150 and the cured bag-shaped resin fiber layer 110a through the fastening component.

Figure 6:
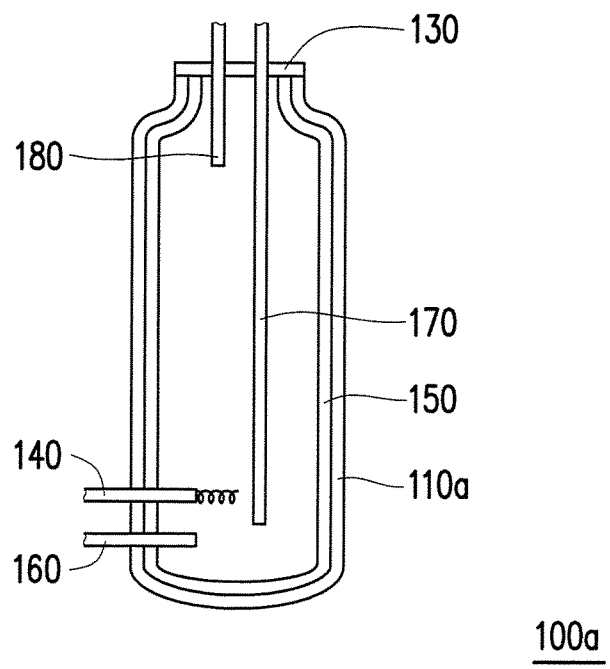
FIG. 6 is a schematic diagram illustrating assembly of a pressure vessel with a heating device according to another exemplary embodiment.
Figure 7:
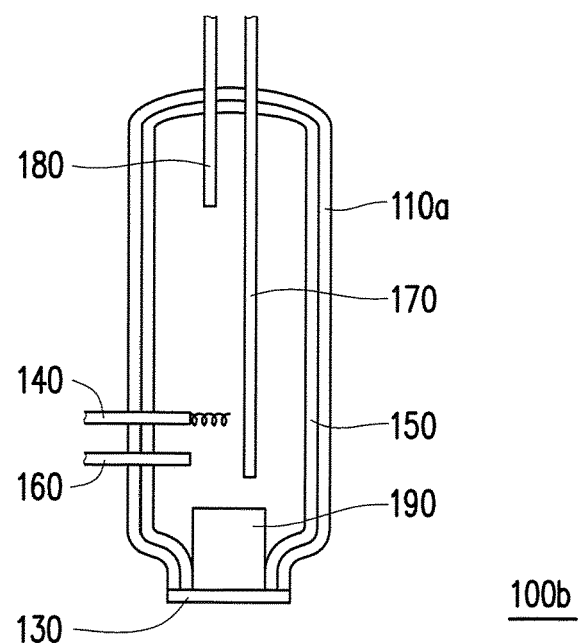
FIG. 7 is a schematic diagram illustrating assembly of a pressure vessel with a heating device according to another exemplary embodiment.
Figure 8:
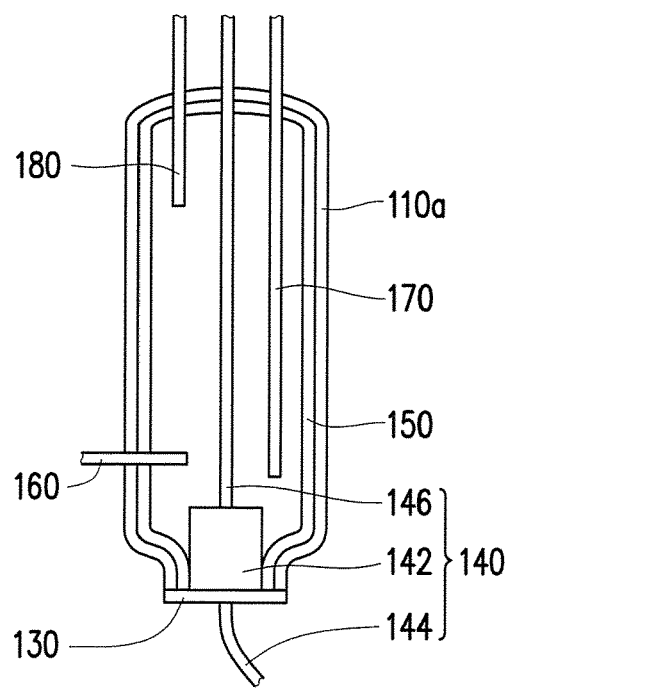
FIG. 8 is a schematic diagram illustrating assembly of a pressure vessel with a heating device according to another exemplary embodiment.

FIG. 6 is a schematic diagram illustrating assembly of a pressure vessel with a heating device according to another exemplary embodiment. FIG. 7 is a schematic diagram illustrating assembly of a pressure vessel with a heating device according to another exemplary embodiment. FIG. 8 is a schematic diagram illustrating assembly of a pressure vessel with a heating device according to another exemplary embodiment. It is noted that the pressure vessels 100a, 100b, 100c shown in FIG. 6, FIG. 7 and FIG. 8 contains many features that are the same as or similar to the pressure vessel 100 disclosed earlier with FIG. 5. For the purpose of clarity and simplicity, detailed descriptions of same or similar features may be omitted, and the same reference numbers are used in the drawings and the descriptions to refer to the same or like parts. The main differences between the pressure vessels 100a, 100b, 100c and the pressure vessel 100 are described hereinafter.

Referring to FIG. 6 to FIG. 8, to reduce the weight of the pressure vessel, one may optionally choose to remove the external mold 120 after the bag-shaped resin fiber layer 110a is cured, and take the cured bag-shaped resin fiber layer 110a and the bag-shaped insulation layer 150 as the final product. In other words, in an embodiment disclosed herein, the manufacturing method of the pressure vessel may further include removing the external mold 120 after curing the bag-shaped resin fiber layer 110a. In addition, in order to let the external mold 120 be easily removed, a release agent may be applied to an inner surface of the external mold 120 before the bag-shaped fiber layer 110 or the bag-shaped resin fiber layer 110a is placed in the external mold 120. The release agent is a chemical agent located between the mold and the product that may have thermal stability and stress resistance to avoid decomposition or abrasion. Therefore, applying the release agent on the inner surface of the external mold 120 allows the external mold 120 to be separated from the bag-shaped resin fiber layer 110a easily.

Referring to FIG. 6, specifically, the pressure vessel 100a of an embodiment disclosed herein may be an inner vessel of an electric water heater. Accordingly, the first bag opening 112 and the second bag opening 152, which are cured and attached together, may be sealed with a cover cap 130 after the heating device 140 is installed in the bag-shaped insulation layer 150. In this embodiment, the pressure vessel 100a shown in FIG. 6 may include an inlet tube 170 and an outlet tube 180, which may be preassembled with the cover cap 130. To be more specific, the cover cap 130 (with the inlet tube 170 and the outlet tube 180), the heating device 140, the sensor 160, and/or a control valve may be fastened to the bag openings of the bag-shaped insulation layer 150 and the cured bag-shaped resin fiber layer 110a by the fastening components described above. The length of the inlet tube 170 may be longer, so the inlet tube 170 can extend to the bottom (relative to the water level) of the pressure vessel 100a to inject cold water or water at room temperature into the pressure vessel 100a. The length of the outlet tube 180 is shorter, such that the hot water heated by the heating device 140 may be dispensed by the outlet tube 180.

Referring to FIG. 7, the pressure vessel 100b of an embodiment disclosed herein may be an inner vessel of the solar energy water heater. In this embodiment, the pressure vessel 100b shown in FIG. 7 may include the inlet tube 170, the outlet tube 180, and a heat exchanger 190 that may be fastened to the bag-shaped insulation layer 150 and the cured bag-shaped resin fiber layer 110a by the fastening components described above. To be more specific, the heat exchanger 190 may be fastened to the bag openings of the bag-shaped insulation layer 150 and the cured bag-shaped resin fiber layer 110a by the fastening component. The inlet tube 170 and the outlet tube 180 may penetrate the pressure vessel 100b and to be fastened to the pressure vessel 100b by the fastening component.

Referring to FIG. 8, the pressure vessel 100c may be an inner vessel of a combustion heater. In an embodiment disclosed herein, the pressure vessel 100c shown in FIG. 8 may include the inlet tube 170, the outlet tube 180, and the heating device 140, which may also be fastened to the bag-shaped insulation layer 150 and the cured bag-shaped resin fiber layer 110a by the fastening component described above. In an embodiment disclosed herein, the heating device 140 is fastened at the second bag opening 152 and located in the cavity of the bag-shaped insulation layer 150 with the cover cap 130 sealing thereon. To be more specific, the heating device 140 may include a combustion component 142, gas inlet tube 144 and a gas outlet tube 146. The combustion component 142 may be fastened to the bag openings of the bag-shaped insulation layer 150 and the cured bag-shaped resin fiber layer 110a by the fastening component. The gas inlet tube 144 is connected to the combustion component 142 to transmit combustible gas, e.g., nature gas, and air to the combustion component 142 for burning. One end of the gas outlet tube 146 is connected to the combustion component 142, and the other end of the gas outlet tube 146 penetrates the pressure vessel 100c and extends to the external environment, so as to discharge the exhaust gas through the gas outlet tube 146. Certainly, the application of the pressure vessel made by the manufacturing method of the present disclosure is not limited thereto.

In summary of the present disclosure, the bag-shaped insulation layer is placed in the bag-shaped fiber layer and then the bag-shaped fiber layer is placed in the external mold. Then, a pressure is applied to the inner cavity of the bag-shaped insulation layer and the air is evacuated from the bag-shaped fiber layer, so the bag-shaped insulation layer and the bag-shaped fiber layer become tightly adjacent to the external mold. The resin solution is injected into the bag-shaped fiber layer to form the bag-shaped resin fiber layer soaked with resin solution, and a heating process is performed to cure the bag-shaped resin fiber layer to form the pressure vessel. As such, the bag-shaped insulation layer is configured to insulate the liquid contained in the pressure vessel from the bag-shaped resin fiber layer. In addition, the external mold of the present disclosure is located outside the bag-shaped resin fiber layer, so it can be optionally removed after the manufacturing process, such that the weight of the pressure vessel can be reduced, and the external mold can be reused to lower the production cost. The present disclosure may also choose not to remove the external mold to enhance the structural rigidity of the pressure vessel. Therefore, the manufacturing method of the pressure vessel in the present disclosure can enhance the design flexibility of the final product.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A manufacturing method of a pressure vessel with a heating device, the manufacturing method comprising:
   providing a bag-shaped fiber layer having a first bag opening;
   providing a bag-shaped insulation layer having a second bag opening;
   disposing the bag-shaped insulation layer in the bag-shaped fiber layer through the first bag opening, and the second bag opening corresponding to the first bag opening;
   disposing the bag-shaped fiber layer and the bag-shaped insulation layer in an external mold;
   performing a pressurizing process in an inner cavity of the bag-shaped insulation layer through the second bag opening and an air is evacuated out of the bag-shaped fiber layer, such that an outer surface of the bag-shaped insulation layer becomes tightly adjacent to an inner surface of the bag-shaped fiber layer and an outer surface of the bag-shaped fiber layer becomes tightly adjacent to an inner surface of the external mold;
   injecting a resin solution into the bag-shaped fiber layer to form a bag-shaped resin fiber layer soaked with the resin solution;
   performing a curing process on the bag-shaped resin fiber layer to cure the bag-shaped resin fiber layer, so as to attach the bag-shaped resin fiber layer to the bag-shaped insulation layer;
   fastening a heating device to the bag-shaped resin fiber layer and the bag-shaped insulation layer; and
   sealing the first bag opening and the second bag opening with a cover cap.

2. The manufacturing method of the pressure vessel with the heating device as claimed in claim 1, wherein the heating device comprises an electric heater, a combustion heater, or a heat exchanger.

3. The manufacturing method of the pressure vessel with the heating device as claimed in claim 1, wherein material of the bag-shaped fiber layer comprises carbon fiber, glass fiber, or aramid fiber.

4. The manufacturing method of the pressure vessel with the heating device as claimed in claim 1, wherein the bag-shaped fiber layer is formed by a weaving method.

5. The manufacturing method of the pressure vessel with the heating device as claimed in claim 1, wherein the bag-shaped fiber layer is formed by a non-weaving method.

6. The manufacturing method of the pressure vessel with the heating device as claimed in claim 1, wherein the pressurizing process comprises:
   providing gas and/or liquid with positive pressure into the bag-shaped insulation layer through the second bag opening.

7. The manufacturing method of the pressure vessel with the heating device as claimed in claim 1, wherein the external mold further comprises at least one discharge outlet, and air between the external mold and the bag-shaped insulation layer is discharged from the discharge outlet.

8. The manufacturing method of the pressure vessel with the heating device as claimed in claim 7, further comprises:
   performing an air extracting process to the discharge outlet, such that the air between the external mold and the bag-shaped insulation layer is extracted from the discharge outlet.

9. The manufacturing method of the pressure vessel with the heating device as claimed in claim 1, wherein the external mold further comprises a resin injection hole, the resin solution is injected into the bag-shaped fiber layer between the external mold and the bag-shaped insulation layer through the resin injection hole, such that the bag-shaped fiber layer is soaked in the resin solution to form the bag-shaped resin fiber layer.

10. The manufacturing method of the pressure vessel with the heating device as claimed in claim 9, wherein the method of injecting the resin solution between the external mold and the bag-shaped insulation layer comprises pressurizing injection and/or siphoning injection.

11. The manufacturing method of the pressure vessel with the heating device as claimed in claim 1, wherein the curing process comprises:
   performing a heating process on the bag-shaped resin fiber layer.

12. The manufacturing method of the pressure vessel with the heating device as claimed in claim 11, wherein the heating process comprises infrared irradiation, electric heating, steam heating, or thermal fluid heating.

13. The manufacturing method of the pressure vessel with the heating device as claimed in claim 1, wherein the bag-shaped fiber layer further comprises at least one fastening component engaged with the bag-shaped fiber layer.

14. The manufacturing method of the pressure vessel with the heating device as claimed in claim 13, wherein the bag-shaped insulation layer further comprises at least one engaging area to be engaged with the at least one fastening component.

15. The manufacturing method of the pressure vessel with the heating device as claimed in claim 13, wherein the step of disposing the bag-shaped insulation layer in the bag-shaped fiber layer further comprises:
   engaging the bag-shaped insulation layer with the at least one fastening component of the bag-shaped fiber layer.

16. The manufacturing method of the pressure vessel with the heating device as claimed in claim 13, wherein the fastening component comprises a metal fastening component.

17. The manufacturing method of the pressure vessel with the heating device as claimed in claim 13, wherein the fastening component comprises a non-metal fastening component.

18. The manufacturing method of the pressure vessel with the heating device as claimed in claim 13, wherein the step of fastening the heating device to the bag-shaped resin fiber layer and the bag-shaped insulation layer further comprises:
   fastening the heating device to the fastening component and the heating device extended to the inner cavity of the bag-shaped insulation layer.

19. The manufacturing method of the pressure vessel with the heating device as claimed in claim 1, wherein the heating device is fastened to a side surface of the bag-shaped resin fiber layer and the bag-shaped insulation layer and extended to the inner cavity of the bag-shaped insulation layer.

20. The manufacturing method of the pressure vessel with the heating device as claimed in claim 1, wherein the heating device is fastened to the first bag opening and the second bag opening with the cover cap sealed thereon.

* * * * *